(12) United States Patent
Quaas et al.

(10) Patent No.: US 10,295,984 B2
(45) Date of Patent: May 21, 2019

(54) SAFETY-RELATED CONTROL DEVICE AND METHOD FOR OPERATING A SAFETY-RELATED CONTROL DEVICE

(71) Applicant: FESTO AG & Co. KG, Esslingen (DE)

(72) Inventors: Jorg Quaas, Ostfildern (DE); Udo Walden, Aichwald (DE)

(73) Assignee: FESTO AG & CO. KG, Esslingen (DE)

( * ) Notice: Subject to any disclaimer, the term of this patent is extended or adjusted under 35 U.S.C. 154(b) by 88 days.

(21) Appl. No.: 15/436,053

(22) Filed: Feb. 17, 2017

(65) Prior Publication Data

US 2017/0242417 A1    Aug. 24, 2017

(30) Foreign Application Priority Data

Feb. 23, 2016  (DE) .................. 10 2016 202 749

(51) Int. Cl.
| | |
|---|---|
| *G05B 19/048* | (2006.01) |
| *G01F 1/00* | (2006.01) |
| *G06F 17/30* | (2006.01) |
| *G05B 19/042* | (2006.01) |
| *G05B 23/02* | (2006.01) |

(52) U.S. Cl.
CPC ....... *G05B 19/048* (2013.01); *G05B 19/0428* (2013.01); *G05B 23/0256* (2013.01); *G05B 2219/24024* (2013.01)

(58) Field of Classification Search
CPC .............. G05B 19/0428; G05B 19/048; G05B 23/0256; G06F 12/1416
See application file for complete search history.

(56) References Cited

U.S. PATENT DOCUMENTS

| | | | | |
|---|---|---|---|---|
| 9,052,887 | B2 * | 6/2015 | Rohleder | G06F 9/28 |
| 9,090,265 | B2 * | 7/2015 | Yousuf | B60W 50/029 |
| 2012/0095573 | A1 * | 4/2012 | Moosmann | G05B 9/03 700/7 |
| 2012/0304024 | A1 * | 11/2012 | Rohleder | G06F 9/28 714/49 |
| 2014/0067192 | A1 * | 3/2014 | Yousuf | B60W 50/029 701/31.4 |
| 2015/0019154 | A1 * | 1/2015 | Usami | G06F 17/30528 702/100 |
| 2016/0318735 | A1 * | 11/2016 | Zhao | B66B 5/0018 |

FOREIGN PATENT DOCUMENTS

| | | |
|---|---|---|
| DE | 19756616 | 7/1999 |
| DE | 102013213402 | 1/2015 |

\* cited by examiner

*Primary Examiner* — Abdelmoniem I Elamin
(74) *Attorney, Agent, or Firm* — Hoffmann & Baron, LLP

(57) ABSTRACT

A safety-related control device for controlling an actuator with a first processing device that is configured to provide a safety function for the generation and/or processing of a signal for a safety-related control of the actuator, and a second processing device that is configured to provide an operating and/or additional function for the generation, processing, diagnostics, reproduction and/or transmission of further signals associated with the operation of the control device and/or of the actuator, and wherein the second processing device is furthermore configured to provide a test function for monitoring the functionality of the safety function.

11 Claims, 2 Drawing Sheets

SAFETY-RELATED CONTROL DEVICE AND METHOD FOR OPERATING A SAFETY-RELATED CONTROL DEVICE

BACKGROUND OF THE INVENTION

The invention relates to a safety-related control device that is designed to provide a safety function for the generation and/or processing of a signal for a safety-related control, in particular for the adoption of a safe state of an actuator, in particular a processor valve and/or control element.

Such a safety-related control device should ensure for example that an actuator, for example a valve, can be moved to a safe state in an emergency. A safe state can for example be a closed position or open position of a valve member of the valve. The safety function that is to ensure the safety-related control must satisfy certain safety requirements, such as a very low probability of malfunction. If the safety function is implemented as a software function or with the aid of software, then it must be ensured that this software function or software is executed deterministically and can provide the desired result, for example the safety-related control, within a specified time period. The safety function can for example be designed as a real-time system. The safety requirements to be met are defined for example in Norm DIN EN 61508.

It is desirable to provide the safety-related control device with further functions. In particular it is desirable to provide the safety-related control device with functions for the generation, processing, diagnostics, reproduction and/or output of further signals connected with the operation of the control device and/or of the actuator. In particular, functions for the diagnostics, transmission and/or reproduction of data preferably required in connection with the safety function are conceivable. For example this may involve a function for controlling a display or a function for communication via a fieldbus. Furthermore it is also conceivable to integrate in the safety-related control device functions that are not directly connected with the safety function but instead for example relate to the normal operation of the actuator to be controlled. In the context of such a function integration it is conceivable for example to provide all control functions for the actuator as well as the aforementioned safety functions in a single safety-related control device. Such a safety-related control device can for example be designed as a positioner and/or control head.

The aforementioned further functions which are to be additionally provided by the safety-related control device are hereinafter also referred to as operating and/or additional functions. They can for example differ from the safety functions in that they are not safety-related and therefore have to satisfy less strict safety requirements than the safety functions. Preferably no safety requirements are placed on the associated software and electronics. The operating and/or additional functions can include in particular non-deterministic and/or non-real-time capable software functions.

There are ways of implementing the safety function jointly with operating and/or additional functions on a processing device, such as for example a microcontroller. With such a procedure the operating and/or additional functions often have to be implemented with the same high safety requirements as the safety function.

SUMMARY OF THE INVENTION

The invention provides another approach. According to the invention the safety-related control device comprises a first processing device that is configured to provide a safety function for the generation and/or processing of a signal for a safety-related control, in particular for the adoption of a safe state, of the actuator, and a second processing device that is configured to provide an operating and/or additional function for the generation, processing, diagnostics, reproduction and/or output of further signals that are connected to the operation of the control device and/or of the actuator.

According to the invention the safety function and the operating and/or additional function are thus realized on two different processing devices, such as two different microcontrollers.

In this way the advantage is obtained that the operating and/or additional function does not have to satisfy the same safety requirements as the safety function. Accordingly the development of the operating and/or additional function is facilitated.

If on the other hand the safety function and operating and/or additional function are executed on the same processing device, then the reliability of the safety function depends also on the implementation of the operating and/or additional function, since there is then the risk that the operating and/or additional function occupies, at least temporarily, certain resources and the safety function therefore cannot be executed as necessary. An implementation of the operating and/or additional function that excludes or sufficiently reduces this risk therefore becomes all the more difficult the more extensive and complex the design of the operating and/or additional function. Specifically with increasing function integration (diagnostics, high-quality displays, fieldbuses) there is increasingly a conflict of interests between the high demands placed on the safety integrity of the safety function and the functional requirements of the operating and/or additional function.

This problem is solved by implementing the safety function and the operating and/or additional function on two processing devices, such as for example two separate microcontrollers.

The first processing device is preferably configured as a real-time system, so that the provision of the safety function within a specifically defined time interval is ensured. In particular the first processing device is configured as a deterministic real-time system, so that time requirements placed on the safety function can be ensured. Preferably no non-safety-related function is provided on the first processing device.

In order to ensure the functionality of the safety function, it is also desirable to provide a test function that monitors the functionality of the safety function. Such a test function is proposed for example in Norm DIN 13849-1, Category 2—Single-channel structure with separate test device.

Normally such a test function is realized by means of a simple, discrete electronic component, whose function essentially consists in sending a test signal to the safety function at regular intervals and checking whether an expected confirmation signal is received in response to the test signal. If no confirmation signal is received, the test function issues an alarm signal and/or executes an emergency control, such as for example an emergency shutdown. The test function can preferably include diagnostics functions, which are used by a higher level system, such as for example an overriding memory programmable control (MPC) or programmable logic controller (PLC), in order to monitor the safety function.

According to the invention it is envisaged that the second processing device—i.e. the processing device on which the operating and/or additional function is already realized—is furthermore configured to provide a test function for monitoring the functionality of the safety function.

According to the invention the test function is therefore realized not by means of a simple, discrete electronic component, but instead is provided on the same processing device, such as a microcontroller, on which the operating and/or additional function is already provided.

In this way, in particular, the advantage is obtained that no additional hardware component is necessary in order to provide the test function. In addition the advantage is obtained that the test function is now implemented on a processing device, such as for example a microcontroller, that is more powerful than a simple, discrete electronic component, and it thus becomes possible to arrange the test function also to be more complex depending on the field of application and/or requirements. In addition the test function, since it is now provided on the same processing device as the operating and/or additional function, can access in a simple manner the operating and/or additional function.

The test function is preferably designed, according to the result of the monitoring of the safety function, to undertake a control of the actuator and/or to output via an alarm module and alarm signal, for example to an overriding MPC or PLC. In particular the test function is designed to detect a malfunction of the safety function and to notify this.

The control device is preferably a device that is used in process automation. In particular the control device is a device with a safety integrity level (SIL) 2 for applications in low-demand mode or high-demand mode. Such a device is formed for example according to Norm DIN EN 61508.

According to the invention a method for operating a safety-related control device is furthermore provided. The safety-related control device serves to control an actuator, in particular a process valve and/or control element, and has a first processing device and a second processing device. The method includes the following steps: provision of a safety function for the generation and/or processing of a signal for a safety-related control, in particular for the adoption of a safe state, of the actuator on the first processing device, provision of an operating and/or additional function for the generation, processing, diagnostics, reproduction and/or output of further signals connected with the operation of the control device and/or of the actuator on the second processing device, and provision of a test function for monitoring the functionality of the safety function on the second processing device.

Advantageous modifications are discussed below.

Preferably the first processing device comprises a first processor core and/or a logic device and is designed to provide the safety function on the first processor core and/or on the logic device. The second processing device preferably includes a second processor core and is designed to provide the test function and the operating and/or additional function on the second processor core.

The safety function and the operating and/or additional function are in particular implemented on different hardware components. In this way it is ensured that the operating and/or additional function does not interfere with the execution of the safety function.

The safety function is provided on its own hardware component, i.e. on the first processing device. In this way it becomes simpler to develop and test the safety function corresponding to the normative specification.

Furthermore the operating and/or additional function is separate from the safety function and is provided on a different hardware component, namely the second processing device. In particular, all non-safety-related functions are provided on a different hardware component or processing device than the safety function. In this way an expandability of the operating and/or additional function is facilitated.

The safety function can be provided on a first processor core or on a logic module. Suitable logic modules are for example FPGA, PLA or ASIC. The processor core can be part of a single-core or multicore processor.

The test function and the operating and/or additional function are preferably provided on a second processor core. In an advantageous modification the first processor core and the second processor core can belong to the same multicore processor.

Expediently the first processing device and the second processing device are communicatively connected to one another, preferably via a digital communication interface.

In a preferred arrangement the first processing device comprises a first microcontroller and/or the second processing device comprises a second microcontroller.

The safety function can be provided on the first microcontroller and the test function and the operating and/or additional function can be provided on the second microcontroller.

In this way a particularly good separation between safety-relevant and non-safety-relevant functions can be achieved.

According to a preferred arrangement the operating and/or additional function is a non-safety-related function. For example, the operating and/or additional function is a non-real-time capable and/or non-deterministic software function.

On account of the separation discussed above of the operating and/or additional function from the safety function, the operating and/or additional function does not have satisfy the same safety requirements as the safety function. Accordingly the development expenditure of the operating and/or additional function is reduced. The operating and/or additional function can optionally be designed as a non-real-time capable and/or non-deterministic software function.

Expediently the safety function is designed to send a test signal, preferably periodically, to the test function in order to cause the test function to perform a monitoring operation in relation to the safety function.

The monitoring operation involves for example the transmission of a test signal to the safety function and checking whether in response to the test signal an expected confirmation signal is received from the safety function.

In particular the second processing device has access to information and/or an expectation as regards the times and/or the content of the output of the test signal, and is designed to adapt the provision of the test function and/or the operating and/or additional function based on this information and/or expectation.

Preferably the two processing devices are connected via a digital communication interface, and the aforementioned information is provided via this communication interface to the second processing device.

By adapting the provision of the test function and/or of the operating and/or additional function it can be ensured that the test function can be properly executed at the specified times, so that the safety function is suitably monitored.

According to a preferred arrangement the test function is designed as a software module. Preferably, the software is a portable software module.

Such a test function can be integrated autonomously in more complex software systems without having to rely on the surrounding system.

In particular the second processing device comprises a diagnostics function for checking the validity of the test function, preferably by means of a memory integrity check.

In this way it can be ensured that the test function can be executed properly.

Preferably the test function is designed, to influence the operation of the operating and/or additional function and/or to access the operating and/or additional function based on the result of the monitoring of the safety function.

Accordingly the operating and/or additional function can be used in order to react to a result of the monitoring of the safety function. For example, by means of an operating and/or additional function that serves to control a display, a reproduction of a corresponding message can be shown on the display. Furthermore it is possible by means of an operating and/or additional function serving for communication via a fieldbus, to transmit a corresponding message via the fieldbus. For example, a safety-related channel, such as for example a so-called "black channel" of the fieldbus, can be provided for this purpose.

The access and/or the influencing of the test function on the operating and/or additional function can preferably take place as a result of the evaluation of a watchdog function of the test function, for example if no expected confirmation signal is received from the safety function within a specified time.

BRIEF DESCRIPTION OF THE DRAWINGS

Advantageous embodiments of the invention are illustrated in the drawings, in which.

DETAILED DESCRIPTION

Figure 1:
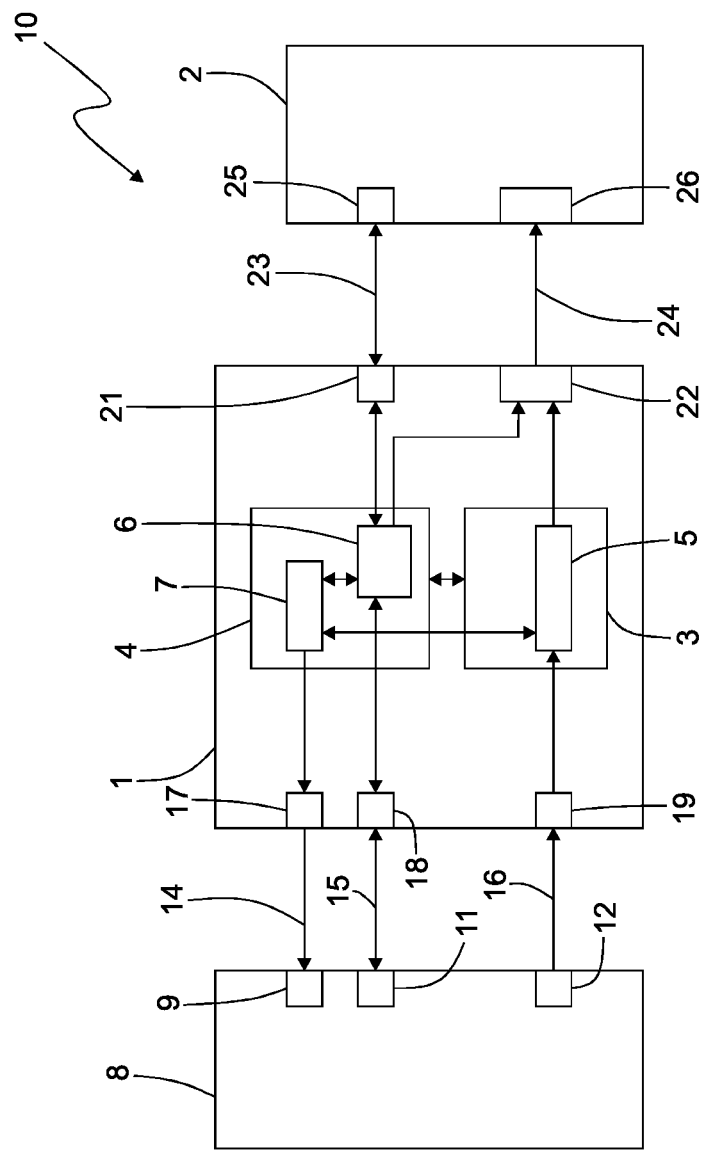
FIG. 1 shows a block diagram of a safety-related control system with a safety-related control device.

FIG. 1 shows a block diagram of a safety-related control system 10, which includes an overriding memory programmable control (MPC) 8, a safety-related control device 1 and an actuator 2. The overriding memory programmable control is e.g. a programmable logic controller (PLC).

The safety-related control device 1 is designed in particular as a control head or positioner and serves to control the actuator 2. Preferably the safety-related control device 1 is designed as an IP convertor, which serves to convert electrical signals into pneumatic signals. The control device 1 is preferably a device that is used in process automation. In particular the control device is a device that is part of a safety function and is described by a safety integrity level (SIL) 2 according to Norm DIN EN 61508.

The actuator 2 includes a controllable element, which hereinafter is also termed an actuator element 26. The actuator 2 furthermore includes a sensor device 25, which serves to detect a state of the actuator 2, such as for example a position of the actuator element 26, and to send corresponding sensor signals to the safety-related control device 1.

In the illustrated example the sensor device 25 is part of the actuator 2. As an alternative it is also possible for the sensor device 25 to be arranged on the control device 1. The communication of the sensor device 25 with the safety-related control device 1 takes place via a sensor connection 23 and via a sensor connection 21 of the control device 1.

The actuator 2 is for example a control element in the process automation, in particular a process valve. The actuator element 26 can form a drive and a fitting, the position of which is controlled and/or regulated by the safety-related control device 1. The sensor device 25 serves to detect the position of the valve element 26.

The drive of the actuator element 26 takes place via a drive device 22 and a drive connection 24. The actuator 2 is a fluidically driven valve, so that the drive device 22 can be designed for example as a control valve and the drive connection 24 can be designed as a fluid connection. As an alternative it is also possible for the actuator 2 to be mechanically driven. In this case the drive device 22 can be designed for example as an electric motor and the drive connection 24 as a mechanical coupling element, such as for example a drive shaft. In addition the actuator 2 can be electrically controlled. In this case the drive can for example be a pneumatic or electrical drive. The drive device 22 is designed for example as an electrical driver unit and the drive connection 24 as an electrical connection.

The safety-related control device 1 provides an operating and/or additional function 6, which serves for the generation, processing, diagnostics, reproduction and/or output of signals connected to the operation of the control device 1 and/or of the actuator 2. In the present exemplary embodiment the operating and/or additional function 6 serves in particular to generate in normal operation control signals that are transmitted to the drive device 22 in order to move the actuator member 26 to a desired position and/or to move it in a desired manner. The operating and/or additional function 6 serves furthermore to process the said source signals received from the sensor device 25.

In addition the operating and/or additional function 6 is designed to carry out a communication with the MPC 8. In the illustrated exemplary embodiment this communication is bidirectional and takes place via a communications path that runs via the control connections 11 and 18, which are connected to one another via a control connection 15. The communications path can for example be implemented as a fieldbus. The control connection 15 is for example a 2-conductor interface.

Via this communications path the operating and/or additional function 6 receives for example operating signals from the MPC 8, which indicate the position to which the actuator 26 should be moved. Furthermore the operating and/or additional function 6 of the MPC 8 can notify via this communications path in which position the actuator element 26 is momentarily located.

The operating and/or additional function 6 can furthermore include a diagnostics function, which serves to evaluate available data. In addition the operating and/or additional function 6 can serve to control a display, not shown in the figure, in order for example to show data obtained by means of the diagnostics function.

The safety-related control device 1 furthermore includes a safety function 5, which satisfies certain requirements, in particular certain safety requirements, for example according to Norm DIN EN 61508. This includes for example the generation and/or processing of a signal for a safety-related control of the actuator 2, in order to be able to move the actuator 2 to a safe state. If the actuator 2 is the aforementioned control element or process valve in the process automation, then the safe state can for example be that the valve member is in a closed position or an open position.

The safety function 5 should ensure that the actuator 2 can be moved reliably, preferably at any time, to the safe state, even if the operating and/or additional function 6, which, as already mentioned hereinbefore, serves also to control the actuator 2, malfunctions.

For this reason the safety function 5 must satisfy higher requirements, for example according to Norm DIN EN 61508, in particular safety requirements, than the operating and/or additional function 6. Preferably the safety function 5 is a safety-related function, while the operating and/or additional function 6 is in particular a non-safety-related function. A safety-related function is e.g. a function that carries out a specific operation with a predetermined probability of failure within a specified time. A safety-related function can for example be formed as a real-time capable function or deterministic function.

For the provision of the safety function 5 and the aforementioned operating and/or additional function 6, the safety-related control device 1 includes a first processing device 3 and a second processing device 4. The first processing device 3 and the second processing device 4 are in particular respectively suitable for providing logic functions and/or software functions without thereby interfering in the logic functions and/or software functions provided on the respectively other processing device 3 or 4, or without occupying these required resources.

The first processing device 3 is for example a first microcontroller or a logic module of the control device 1. The second processing device 4 is for example a second microcontroller.

The safety function 5 is provided on the first processing device 3, while the aforementioned operating and/or additional function 6 is provided on the second processing device 4.

The safety function 5 and the operating and/or additional function 6 are accordingly carried out on different processing devices. In this way it is ensured in particular that the operating and/or additional function 6 cannot interfere with the execution of the safety function 5.

Since the safety function 5 is provided on its own processing device, it also becomes simpler to develop and to test the safety function 5 corresponding to the safety requirements.

Also, on account of the hardware separation of the safety function 5 and operating and/or additional function 6, it becomes easier to develop and/or expand the operating and/or additional function. In particular the strict requirements applicable to the safety function 5, for example according to Norm DIN EN 61508, in particular safety requirements, do not have to be met.

The safety-related control by the safety function 5 is triggered for example by a command that is received by the MPC 8.

In the illustrated example the MPC8 has a safety-related MPC output 12, which is communicatively connected via a safety connection 16 to a safety-related input 19 of the safety-related control device 1. The safety function 5 can receive via the safety-related input 19 commands from the MPC 8.

The communications path formed by the safety-related MPC output 12, the safety connection 16 as well as the safety-related input 19 can be a physical or a logic communications path. For example, the communications path can be physically realized by means of its own dedicated conductor. As an alternative the communications path can also be realized logically as a channel of a fieldbus provided between the MPC and the control device 1. In this connection it may in particular be the same fieldbus that already provides the communications path, discussed hereinbefore, between the MPC 8 and the operating and/or additional function.

According to the invention a test function 7 is furthermore provided on the aforementioned second processing device 4, on which the operating and/or additional function is already provided. This test function serves to monitor the functionality of the safety function 5.

Since this test function 7 is provided on the same processing device as the operating and/or additional function, in particular the advantage is obtained that no additional hardware component is necessary in order to provide the test function 7. In addition there is the advantage that the test function 7 can now also be designed more complex depending on the field of use or requirements, since the second processing device 4 has the required performance capacity. In addition the test function 7, since it is now provided on the same processing device as the operating and/or additional function 6, can access the operating and/or additional function 6 in a simple manner.

The test function 7 provides for example the functionality of the test device proposed according to Norm DIN 13849-1, Category 2—Single-channel structure with separate test device.

A digital communications interface is provided between the first processing device 3 and the second processing device 4, through which the safety function 5 and the test function 7 can communicate with one another.

For example, the safety function 5 is designed to transmit periodically via this communication interface a test signal to the test function 7, in order to cause the test function 7 to carry out a monitoring operation in relation to the safety function 5. The monitoring operation is for example the transmission of a test signal to the safety function 5 and checking whether the test function 7 receives an expected confirmation signal from the safety function 5 in response to the test signal.

If no expected confirmation signal is received, then the test function 7 sends an alarm signal to the MPC 8.

To this end the test function 7 is connected via a communications path to the MPC 8. In the illustrated example this communications path runs via an alarm output 17 of the safety-related control device 1, an alarm connection 14 and an alarm input 9 of the MPC 8. This communications path can be provided as a physical or also as a logical communications path. For example, the communications path can be physically realized by means of its own dedicated conductor. As an alternative the communications path can also be realized logically as a channel of a fieldbus provided between the MPC 8 and the control device 1. In this case it can in particular be the same fieldbus that already provides the communications path, described hereinbefore, between the MPC 8 and the operating and/or additional function.

The test function 7 can furthermore be designed, as an alternative or in addition to sending the alarm signal to the MPC 8, to perform or effect a control of the actuator 2 so as to move the actuator 2 to a safe state.

For this purpose the test function 7 can for example be designed to access the operating and/or additional function 6, in order to carry out a corresponding control of the actuator 2 by means of the operating and/or additional function 6. Alternatively to this the test function 7 can also have its own dedicated communications path to the drive device 22, in order to effect a corresponding control of the actuator 2.

Furthermore the test function 7 can be designed so as to effect by means of an operating and/or additional function 6, which serves to control a display, not illustrated in the figure, a reproduction of a message on the display, which indicates for example the result of the monitoring of the safety function 5. Furthermore the test function 7 can be designed to send by means of an operating and/or additional function 6, which serves for communication via a fieldbus, a message via the fieldbus to the MPC 8. For example such a fieldbus can be provided via the control interfaces 11 and 18 and the control connection 15. In this case the above described communications path via the alarm output 17, the alarm connection 14 and the alarm input 9, can be omitted.

The second processing device 4 is preferably designed to obtain via the digital communication interface information from the first processing device 3 regarding the times of the transmission of the test signal. The second processing device 4 is in particular designed, based on this information, to adapt the provision of the test function 7 and/or of the operating and/or additional function 6. For example the second processing device 4 is designed so as to ensure that at the time of the transmission of the test signal to the test function 7, sufficient resources are available so that the test function 7 can be implemented.

In order to ensure that the test function 7 is implemented properly, the second processing device 4 can also have a diagnostics function to check the validity of the test function 7, preferably by means of a memory integrity check.

Figure 2:
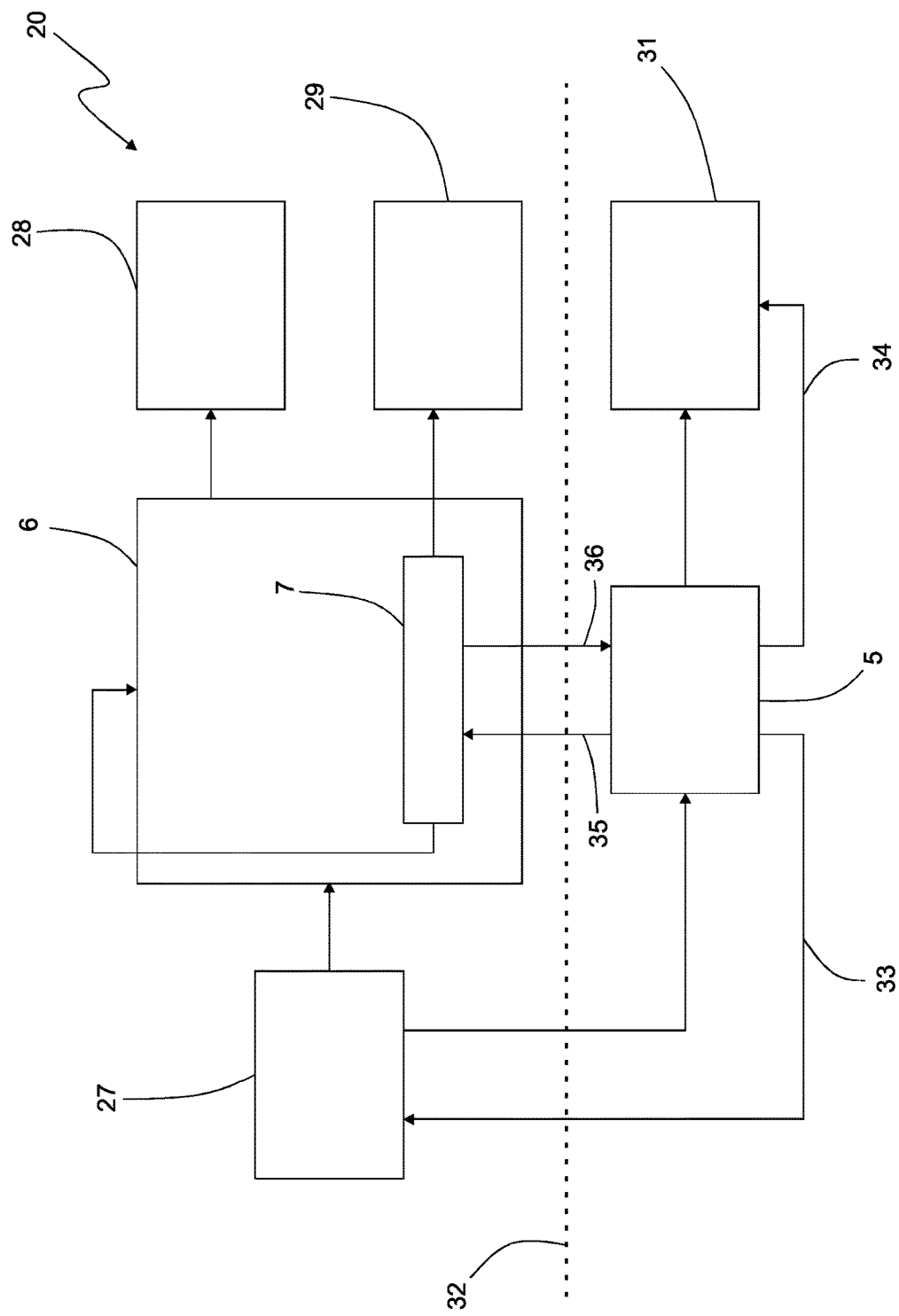
FIG. 2 shows a block diagram of a software and electronics architecture for a safety-related control system.

FIG. 2 shows a block diagram of a software and electronics architecture 20 for a safety-related control system.

The illustrated software and electronics architecture 20 can be used for example for the safety-related control system 10 discussed hereinbefore.

The software and electronics architecture 20 includes a safety-related section and a non-safety-related section.

The safety-related section includes a safety-related input 27, a safety function 5 and also a safety-related output 31.

The non-safety-related section includes an operating and/or additional function 6 as well as a test function 7. The non-safety-related section furthermore includes an operating and/or additional output 28 as well as an alarm output 29.

The dotted line 32 should be understood as a hardware separation line and is intended to show that the operating and/or additional function 6 and the test function 7 are provided on another hardware component than the safety function 5.

The safety function 5 serves to provide a safety-related control at the safety-related output 31 in response to a command received or generated at the safety-related input 27.

In addition to this the safety function 5 is designed to monitor with the aid of the monitoring paths 33 and 34 the functionality of the safety-related input 27 and of the safety-related output 31.

In the context of the safety-related control system 10 discussed hereinbefore, the MPC 8 can for example represent the safety-related input 27, and the drive device 22 or the actuator 2 can represent the safety-related output 31. The safety function 5 of FIG. 2 corresponds in this case to the safety function 5 implemented on the first processing device 3 in FIG. 1.

The test function 7 serves to monitor the functionality of the safety function 5. The safety function 5 sends via a test path 35 a test signal to the test function 7, which causes the test function 7 to execute via a monitoring path 36 a monitoring operation in relation to the safety function 5.

The test function 7 is furthermore designed to send, via an alarm output 29, a message concerning the result of the monitoring to the safety function 5. Finally, the test function 7 is also furthermore designed to influence the operating and/or additional function and/or to access the operating and/or additional function.

The operating and/or additional function 6 is designed to receive signals from the safety-related input 27 and to output signals to the operating and/or additional output 28.

In the context of the safety-related control system 10 described hereinbefore, the digital communications interface between the two processing devices 3 and 4 can for example represent the test path 35 and the monitoring path 36. Furthermore the alarm output 17 can represent the alarm output 29, and the drive device 22 can represent the safety-related output 31 in combination with the operating and/or additional output 28. The test function 7 and the operating and/or additional function 6 of FIG. 2 correspond in this case to the test function 7 and the operating and/or additional function 6 of FIG. 1.

What is claimed is:

1. A safety-related control device for controlling an actuator, the safety-related control device comprising:
 a first microcontroller having a first processing core configured to provide a safety function for generating and/or processing a signal for a safety-related control of the actuator; and
 a second microcontroller electrically connected to the first microcontroller and having a second processing core, the second processing core being configured to provide an operating and/or additional function for the generation, processing, diagnostics, reproduction and/or output of further signals associated with the operation of the control device and/or of the actuator, and further being configured to provide a test function for monitoring the functionality of the safety function,
 wherein the safety function is designed to send a test signal to the test function, in order to cause the test function to execute a monitoring operation in relation to the safety function, and
 wherein the second microcontroller has information relating to the times and/or the content of the transmission of the test signal and is designed to adapt the provision of the test function and/or of the operating and/or additional function on the basis of this information.

2. A method for operating a safety-related control system, the safety-related control system comprising:
 a programmable logic controller;
 a safety-related control device electrically connected to the programmable logic controller and being configured as a control head or a positioner; and
 an actuator connected to the safety-related control device, the actuator being configured as a process valve and having a valve member,
 wherein the control device comprises:
 a first microcontroller electrically connected between the programmable logic controller and the actuator, the first microcontroller having a first processing core configured to provide a safety function for generating and/or processing a signal for a safety-related control of the actuator in order to move the valve member in a closed position or an open position, and
 a second microcontroller electrically connected between the programmable logic controller and the actuator, the second microcontroller having a second processing core, the second processing core being configured to provide an operating and/or additional function for the generation, processing, diagnostics, reproduction and/or output of further signals associated with the operation of the control device and/or of the actuator, and being furthermore configured to provide a test function for monitoring the functionality of the safety function, and wherein the method comprises:

providing a safety function for generating and/or processing a signal for a safety-related control of the actuator on the first processing device;

providing an operating and/or additional function for generating, processing, diagnostics, reproduction and/or transmission of further signals associated with the operation of the control device and/or of the actuator on the second processing device; and providing a test function for monitoring the functionality of the safety function on the second processing device.

3. A safety-related control system comprising:

a programmable logic controller;

a safety-related control device electrically connected to the programmable logic controller and being configured as a control head or a positioner; and an actuator connected to the safety-related control device, the actuator being configured as a process valve and having a valve member, wherein the control device comprises:

a first microcontroller electrically connected between the programmable logic controller and the actuator, the first microcontroller having a first processing core configured to provide a safety function for generating and/or processing a signal for a safety-related control of the actuator in order to move the valve member in a closed position or an open position, and a second microcontroller electrically connected between the programmable logic controller and the actuator, the second microcontroller having a second processing core, the second processing core being configured to provide an operating and/or additional function for the generation, processing, diagnostics, reproduction and/or output of further signals associated with the operation of the control device and/or of the actuator, and wherein the second processing core is furthermore configured to provide a test function for monitoring the functionality of the safety function.

4. The safety-related control system according to claim 3, wherein the first processing device includes a first processor core and/or a logic module and is configured to provide the safety function on the first processor core and/or on the logic component, and the second processing device includes a second processor core and is configured to provide the test function and the operating and/or additional function on the second processor core.

5. The safety-related control system according to claim 3, wherein the first processing device includes a first microcontroller and/or the second processing device includes a second microcontroller.

6. The safety-related control system according to claim 3, wherein the operating and/or additional function is a non-safety-related function.

7. The safety-related control system according to claim 3, wherein the safety function is designed to send a test signal to the test function, in order to cause the test function to execute a monitoring operation in relation to the safety function.

8. The safety-related control system according to claim 3, wherein the test function is designed as a software module.

9. The safety-related control system according to claim 3, wherein the second processing device includes a diagnostics function for checking the validity of the test function.

10. The safety-related control system according to claim 3, wherein the test function is configured to influence the operation of the operating and/or additional function and/or to access the operating and/or additional function.

11. The safety-related control system according to claim 7, wherein the second microcontroller has information relating to the times and/or the content of the transmission of the test signal and is designed to adapt the provision of the test function and/or of the operating and/or additional function on the basis of this information.

* * * * *